Figure 1:
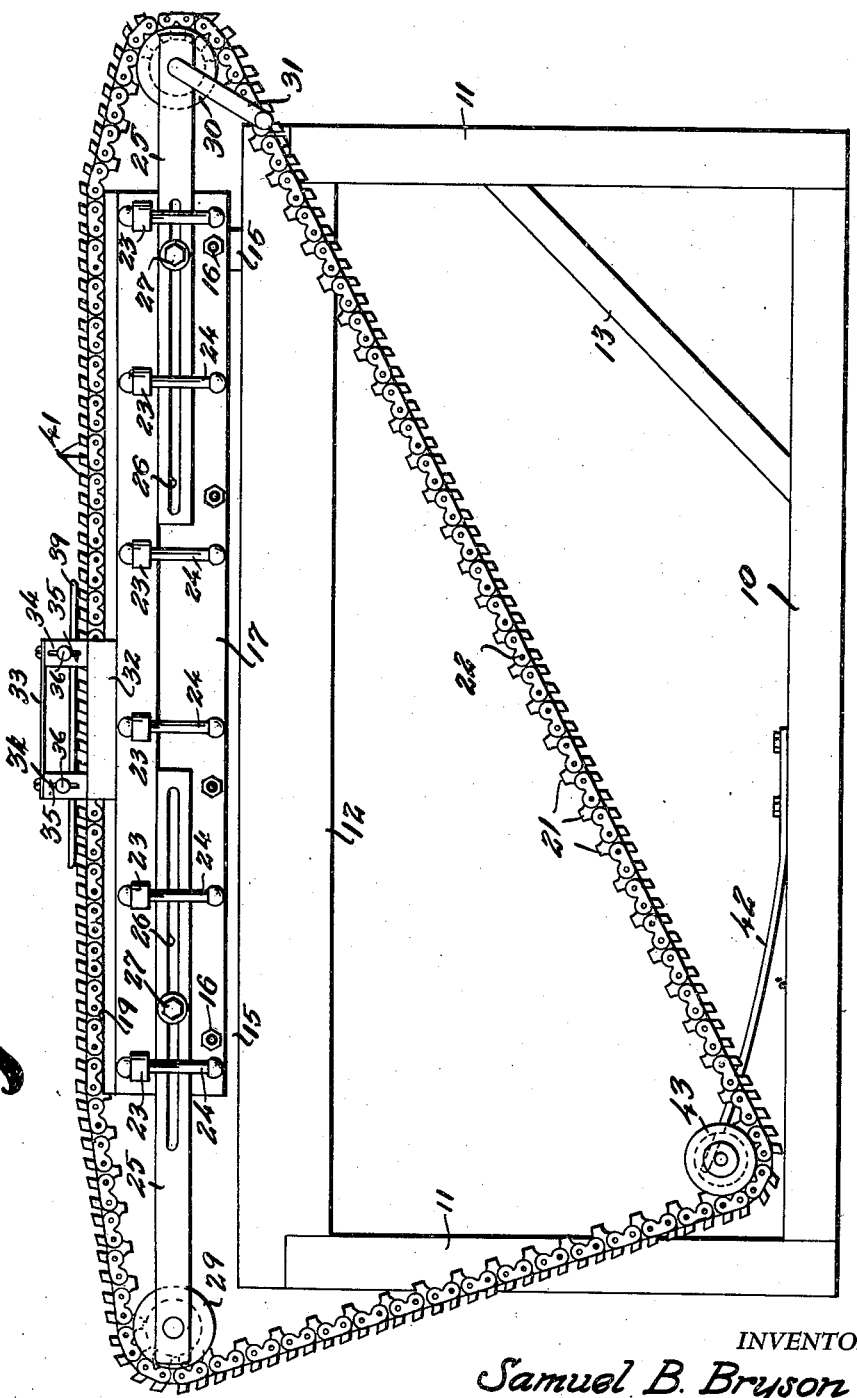

Aug. 30, 1949.  S. B. BRYSON  2,480,546
POWER SAW FILING BENCH
Filed Jan. 28, 1947  2 Sheets-Sheet 1

INVENTOR.
Samuel B. Bryson
BY Victor J. Evans & Co.
ATTORNEYS

Aug. 30, 1949.  S. B. BRYSON  2,480,546
POWER SAW FILING BENCH
Filed Jan. 28, 1947  2 Sheets-Sheet 2
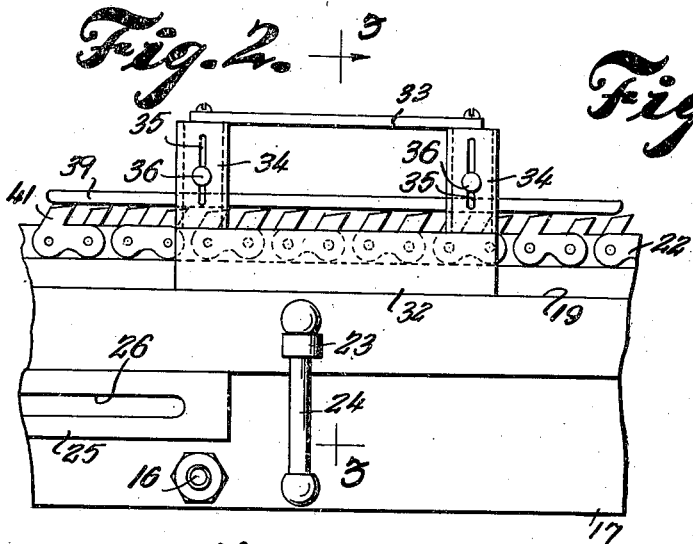
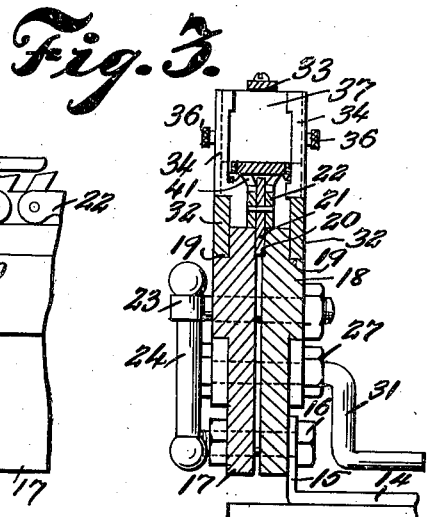
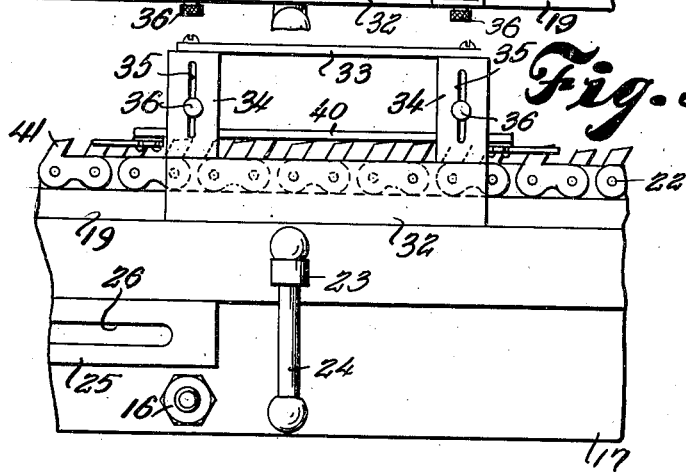
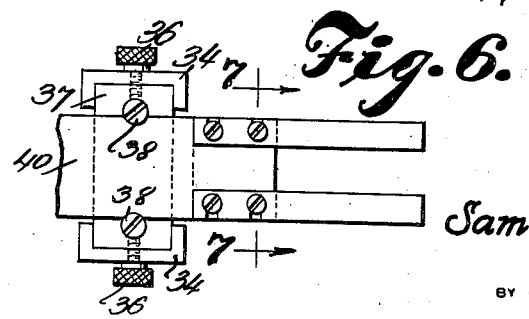
INVENTOR.
Samuel B. Bryson
BY Victor J. Evans & Co.
ATTORNEYS Patented Aug. 30, 1949

2,480,546

UNITED STATES PATENT OFFICE 2,480,546

POWER SAW FILING BENCH

Samuel B. Bryson, Klamath Falls, Oreg., assignor of one-half to Mary E. Bryson, Klamath Falls, Oreg.

Application January 28, 1947, Serial No. 724,745

1 Claim. (Cl. 76—74)

The present invention relates to power saw filing benches and it consists in the combinations, constructions and arrangements of parts herein described and claimed.

The invention contemplates the provision of apparatus particularly adapted to the purpose of filing, gauging power chain saws and consists essentially of a frame, adjustable means for mounting a chain thereon, a tensioning means for the chain, a guideway for the frame and a tool holder slidably mounted thereon and having adjustable means for holding files and gauges.

It is an object of the invention to provide a quick and simple means for filing, gauging and jointing the teeth of a chain saw.

Another object of the invention is to provide means whereby files, gauges and the like may be interchangeably and adjustably applied to the teeth of a saw.

Another object of the invention is the provision of means whereby a plurality of saw teeth may be acted on in a single operation.

Another object of the invention is the provision of means whereby extremely accurate filing and jointing may be had in chain saws.

Other and further objects of the invention will become apparent from a reading of the following specification taken in conjunction with the drawings, in which:

Figure 1 is a vertical elevational view of an apparatus embodying the invention, Figure 2 is an enlarged detail view, in elevation, illustrating certain parts of the invention, Figure 3 is a sectional view taken along line 3—3 of Figure 2, Figure 4 is a plan view of Figure 2, Figure 5 is a view similar to Figure 2 but showing a different tool carried by the apparatus, Figure 6 is a fragmentary view illustrating a detail of the invention, and Figure 7 is a sectional view taken along line 7—7 of Figure 6.

Referring more particularly to the drawings, there is shown therein a bench having a base 10, sides 11 and a top 12, the sides being preferably braced as indicated at 13.

Angle brackets 14 are rigidly attached to the bench top 12 and are provided with upwardly extending ears 15 to which is attached by bolts 16 a frame composed of two vertically extending complementary parts 17 and 18, the top outer edges of which are provided with rails 19 and the inner top edges of which are cut away as indicated at 20 to snugly receive the base portions 21 of the teeth of a chain saw 22.

A series of locking bolts 23 extend laterally through the parts 17 and 18 and are provided with operating handles 24 and provide a means for clamping a section of the saw therebetween.

Extending horizontally from either end of the frame are pairs of arms 25 provided with slots 26 through which are adapted to pass bolts 27. A grooved idler 29 is carried at the outer end of one pair of arms 25 and a sprocket 30 is carried at the outer end of the other pair of arms 25. The sprocket 30 is provided with an operating handle 31.

A carriage 32 is slidably mounted on the rails 19 and is provided with a handle 33 mounted atop two pairs of vertically extending arms 34 having vertically extending slots 35 for the reception of thumb screws 36. Interconnecting each pair of arms 34 at points below the top thereof are cross bars 37 provided with set screws 38.

By means of the screws 36 and 38, various tools such as a jointing file 39 or gauge plate 40 may be adjustably positioned with respect to the teeth 41 of the saw.

A spring 42 is fastened to the base 10 and carries at its free end an idler pulley 43 to hold the saw tightly upon the apparatus.

In operation, it will be seen that the saw is first mounted upon the pulleys 29, 30 and 42 and the frame in such manner that the bases 21 of the teeth of the saw lie between the complementary parts 17 and 18 of the frame. The parts 17 and 18 are then brought together by tightening the bolts 23 thereby locking a section of the saw in position to be worked upon. Any slack in the saw may then be taken up by adjusting the arms 25, thereafter locking the same in position by means of the bolts 27. A tool is then positioned in the carriage 32 and, by means of the handle 33, the carriage is reciprocated from one end of the frame to the other in the rails 19.

While but one form of the invention has been shown and described herein, it will be readily apparent to those skilled in the art that many minor modifications may be made without departing from the spirit of the invention or the scope of the appended claim.

What is claimed is:

An apparatus for filing, gauging and jointing chain saws comprising a base, a frame mounted upon the base, said frame including two vertically disposed complementary parts, having rails in the top outer longitudinal edges thereof and the top inner longitudinal edges spaced and formed to provide a horizontal trackway therebetween, a carriage slidably mounted on the rails in the top outer longitudinal edges of the frame said carriage being provided with two pairs of vertically extending arms, a handle mounted above and between said pairs of vertically extending arms to provide means by which said carriage may be moved on said rails, a tool mounted in the carriage, mechanical means for moving the saw upon the frame and means for locking sections of the saw in the frame.

SAMUEL B. BRYSON.

REFERENCES CITED

The following references are of record in the file of this patent:

UNITED STATES PATENTS

| Number | Name | Date |
| --- | --- | --- |
| 444,848 | Pratt | Jan. 20, 1891 |
| 507,386 | Pike | Oct. 24, 1893 |
| 932,752 | Brey | Aug. 31, 1909 |
| 2,040,852 | Joy | May 19, 1936 |
| 2,339,509 | Olson | Jan. 18, 1944 |
| 2,392,563 | Wilson | Jan. 8, 1946 |
| 2,405,365 | Myers | Aug. 6, 1946 |
| 2,410,828 | Lofstrand | Nov. 12, 1946 |
| 2,413,919 | Huffsmith | Jan. 7, 1947 |
| 2,415,137 | Johnson | Feb. 4, 1947 |